INVENTOR.
JOSE IGNACIO MARTIN ARTAJO

INVENTOR.
JOSE IGNACIO MARTIN ARTAJO

United States Patent Office 3,003,011
Patented Oct. 3, 1961

3,003,011
SYSTEM FOR THE CONSTRUCTION OF ELECTRICAL SECONDARY CELLS, I.E. STORAGE BATTERIES
José Ignacio Martin Artajo, 23 Alberto Aguilera, Madrid, Spain
Filed May 21, 1958, Ser. No. 736,809
6 Claims. (Cl. 136—6)

The present invention relates to storage batteries and pertains more particularly to an improved cell construction for batteries.

Of primary concern in connection with the present invention is the provision of a simple and inexpensive cell construction utilizing a pair of parallel metal plates disposed in spaced relationship and associated with a peripherally extending dielectric frame member sealed to the individual plates so that one of them forms the positive pole of the cell and the other forms the negative pole of the cell, with the individual plates carrying electrolytic plate-forming elements presenting pockets disposed in interdigitated relation with the space between and outside the pockets being filled with liquid electrolyte, the pockets associated with one of the pole plates being filled with an electrochemically active paste and with the pockets associated with the other pole plate being filled with a different electrochemically active paste.

The invention is illustrated in the accompanying drawings wherein.

Figure 1:
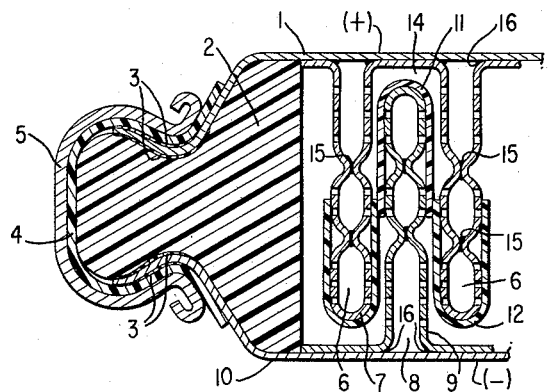
FIG. 1 is a sectional view taken through a portion of a secondary cell constructed in accordance with this invention.
Figure 2:
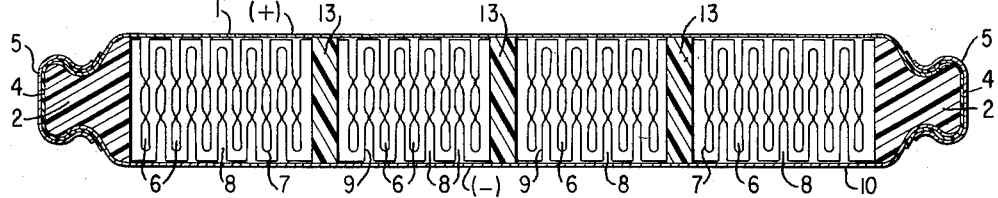
FIG. 2 is a diagrammatic longitudinal section taken through a cell as shown in FIG. 1 and illustrating the cell in its entirety.

Referring at this time more particularly to FIGS. 1 and 2, the cell as shown therein will be seen to consist of a pair of spaced parallel pole plates 1 and 10 which are in the form of thin metal plates respectively constituting the positive and negative poles of the cell. The marginal edges of these plates 1 and 10 overlap the opposite side of a dielectric or insulating frame 2 and together therewith form an impervious casing for the liquid electrolyte of the cell. As can be seen, the marginal edges of the plates 1 and 10 are so shaped as to conform with the sides of the frame 2 and the plates are held against the frame 2 by means of a metallic clamping member 5 having an open rectangular configuration and being generally U-shaped in cross section. Interposed between the member 5 and the plates 1 and 10 is a strip of insulating material 4, preferably synthetic resin or plastic, and in order to prevent leakage, a plastic or adhesive 3 is used both between the plates and the plastic insulating strip 4, as is shown in FIG. 1. The clamping member 5 firmly presses the peripheral or marginal areas of the plates toward each other and into firm engagement with the frame 2.

Each of the pole plates 1 and 10 carries plate forming members 7 and 9, each of which is folded or corrugated to form pockets or fingers with the fingers or pockets of the individual members 7 and 9 being as shown in FIG. 1. This formation presents a series of base portions which are on either side of the fingers or pockets and which engage flatwise against the opposed inner surfaces of the respective plates 1 and 10. Each finger or pocket is provided with undulations on its opposite sides to form a series of substantially separate chambers such as the chamber 6 shown in FIG. 1 in conjunction with the member 7 and the chamber 8 shown in conjunction with the member 9. Within the spaces defined within the fingers or pockets and more specifically within the chambers 6 or 8 thereof, is introduced an electrochemically active paste. The paste may be constituted by the metals or oxides thereof such as C, Zn, Cu, Ag, Fe, Ni, Cd, Pb, etc. The specific paste and electrolyte used forms no part of the present invention and the specific pastes and electrolyte are understood naturally to be chosen in the manner well known in the battery art so as to produce the requisite electric potential due to the electrochemical action.

The base portions of the members 7 and 9 are soldered as at 16 or otherwise joined to their respective pole plates 1 and 10. The members 7 and 9 are perforated at least throughout portions thereof which define the fingers or pockets and consequently the chambers 6 and 8. The engaged portions of the undulations in the fingers or pockets are preferably joined by solder 15 or the like to rigidify the construction and to eliminate as much as possible the chance of swelling of the fingers during use.

The tips of the fingers or pockets are covered by strips 11 and 12 which are impervious to flow of electric current and serve to space the fingers or pockets from each other and act as separators therefor. Preferably the strips 11 and 12 are of sufficient width to overlap each other as is shown in FIG. 1.

Figure 3:
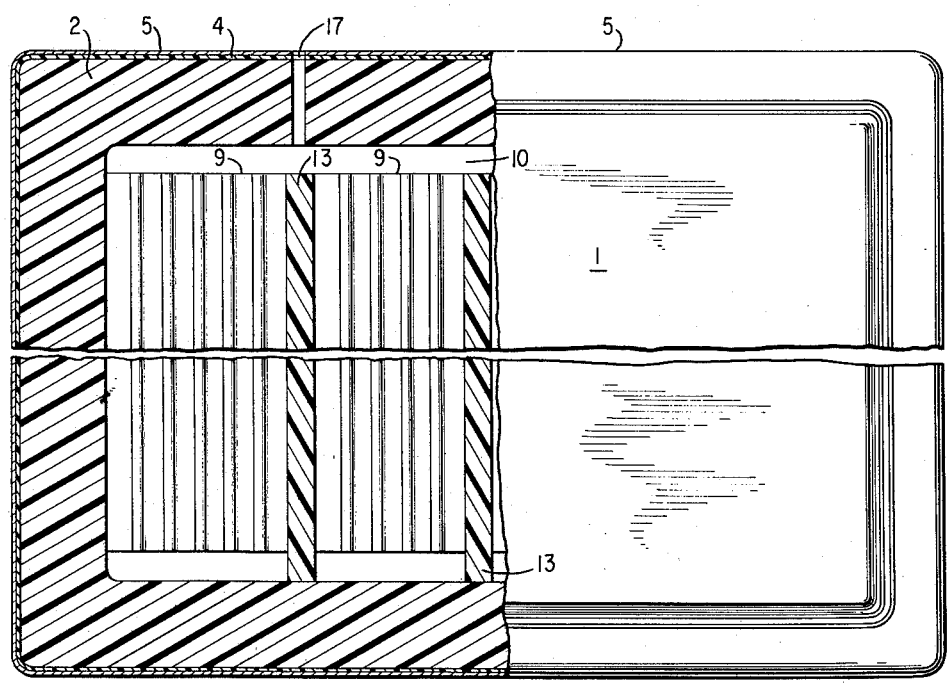
FIG. 3 is a plan view partly in section with a portion of one pole plate broken away and showing the construction of the cell diagrammatically and illustrating the manner in which the dielectric frame surrounds the cell.

The method of constructing cells such as is shown in FIGS. 1–3 is exceedingly simple. The members 7 and 9 are formed and assembled and secured on their respective pole plates 1 and 10. The chambers 6 and 8, of course, contain the requisite electrochemically active pastes and the pole plates together with the attached pocket members are encased within the frame 2 by pushing one plate toward the other until both plates strike against the spacers 13, see FIGS. 2 and 3 particularly. Finally, the cell is sealed by applying the clamping member 5 over the insulator 4. Preferably the member 5 is deformed, after application upon the frame 2, in a press so that the legs of the clamping member are tightly closed upon the frame 2. Application of heat will cause the plastic 3 to adhere to the frame 2 and to the pole plates 1 and 10 to thus seal between these members and, likewise, adhesion and sealing between the insulating strip 4 and the plates 1 and 10 is achieved by plastic 3. The frame 2, as shown in FIG. 3, is provided with a passage 17 for the admission of the electrolyte into space 14 between pole plates 1 and 10.

In the construction shown in FIGS. 4A, 4B, 5A, and 5B, a multicell battery may conveniently be formed.

Figure 5A:
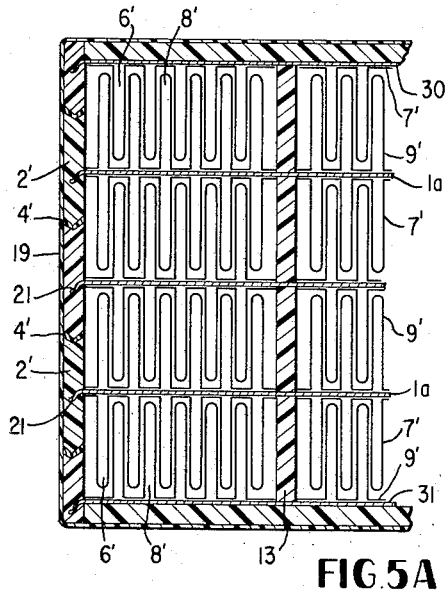
FIGS. 5A and 5B are sections taken through cells constructed in accordance with FIGS. 4A and 4B illustrating diagrammatically the relationship of the plates therein.
Figure 5B:
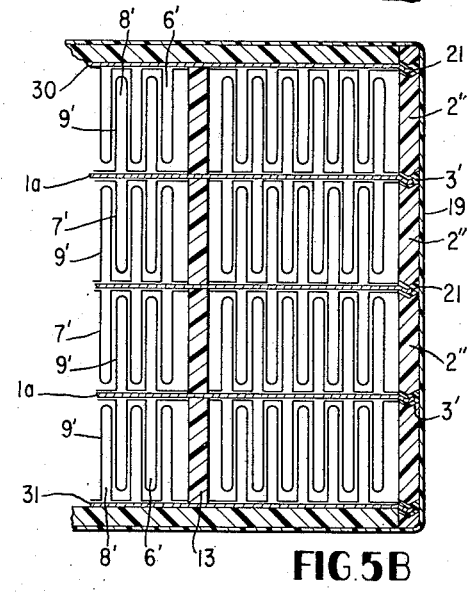

These figures illustrate that single pole plates 1a may be utilized each to mount a pair of plate forming members 7′ and 9′, on opposite sides thereof, save for the end plates 30 and 31, see FIGS. 5A and 5B, which each mount only one pole forming member. In this fashion, a three cell battery would require only four pole plates.

Figure 4A:
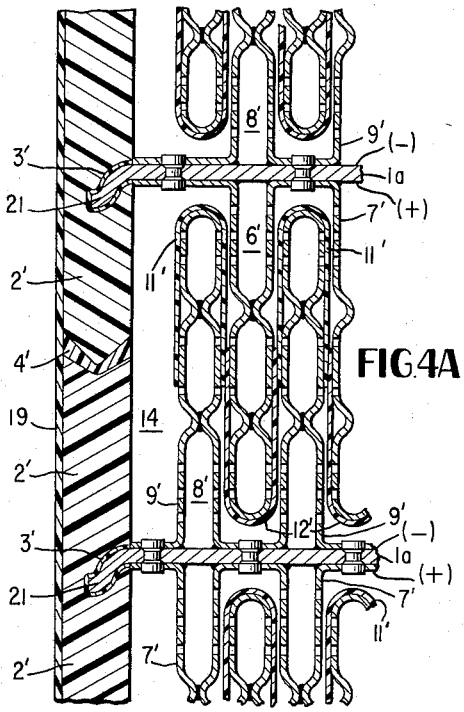
FIGS. 4A and 4B are enlarged, fragmentary sectional views illustrating modified battery constructions of multicellular form.

The frame 2′ is formed of sections stacked one upon the other and in this embodiment of the invention, the opposite ends 21 of the pole plates are received respectively in slots formed on the inner sides of the frame sections and between the edges of adjacent stacked sections as is clearly shown in FIGS. 4A and 5A. For securing the plates and sealing the battery construction, plastic material 3′ is used.

The electrolyte space is indicated by reference character 14, the impervious separator strips by reference characters 11′ and 12′, the chambers within the pervious members 7′ and 9′ by reference characters 6′ and 8′ and the sealing means between the stacked frame members 2′ containing the slots for the pole plates is indicated by the reference character 4′.

Reference numeral 19, indicates the external housing for the battery which may be in the form of a container and it will be appreciated that the terminal pole plates 30 and 31 may be provided with any suitable external posts or connectors.

Figure 4B:
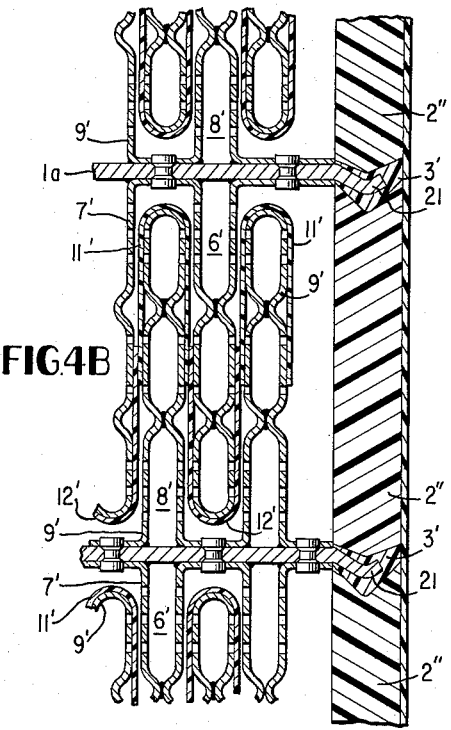

The preceding description relates to the battery of FIGS. 4A and 5A whereas the battery shown in FIGS. 4B and 5B is a variation in the manner of mounting the metal plates inside the frame. In the foregoing description, the frames are produced with slots receiving the plate edges, but in the modification illustrated in FIGS. 4B and 5B the frames 2″ are produced with their edges encased at an angle, placing therein a metal plate with its curved beads, provided with an adhesive, thereafter applying a frame, and on top of this another metal sheet with an adhesive, and so forth, until constituting a series of cells. Both modifications illustrated have metal plates adhered thereto to thus form two external covers.

In order to achieve an even better coupling between the metal plates and the separators, the variation of FIGS. 4A and 4B is applied and constituted by inserting, during the construction of the frame, the edge or bead of a metal plate, also provided with its corresponding adhesive, so that plastic frames are produced with a plate inserted by its beads in the interior thereof. The metal plates can previously be provided with their corresponding pockets, etc. adhered to both sides thereof, or said pockets or containers for the active material can be attached thereto by soldering them to the sheets after having been provided with their corresponding frames.

The frames are stacked by a perfect encasing of their beads and grooves, where it is easy to obtain an efficient impervious seal by means of the corresponding adhesive plastic materials.

The final product is in each case identical, and thus besides all the aforementioned advantages, possesses the most important, residing in that between the exothermic chemical reactions on one plate and the endothermic reactions on the other, a compensation of heat will take place through the metal, and not through the electrolyte, as occurs in the conventional type of battery. The losses and deformations of the plates are greatly reduced in virtue of said compensation.

Although certain specific embodiments of the invention have been shown and described, it is obvious that many modifications thereof are possible. The invention, therefore, is not to be restricted except insofar as is necessitated by the prior art and by the spirit of the appended claims.

I claim:

1. In a storage battery, a pair of spaced, substantially parallel pole plates, an insulating frame assembly maintaining said plates in spaced relationship and electrically insulated one from the other and forming, with such pole plates a space for containing a liquid electrolyte, a plate forming member carried by each of said pole plates, each such member being in the form of a perforate metallic sheet provided with a plurality of traverse folds presenting elongate hollow fingers extending right angularly from the respective pole plate and each such member being rigidly joined to its pole plate in those areas thereof intermediate such fingers, separator strips interposed between said fingers to retain the same in spaced interdigitated relationship to each other and each finger being of a length to extend from its associated pole plate but terminate short of the other pole plate, the hollowed portions within the fingers of one member being filled with an electrochemically active paste and the hollowed portions within the fingers of the other member being filled with an electrochemically active paste so that the pastes and electrolyte will be effective to produce an electrical potential between said pole plates.

2. In a storage battery, a pair of spaced, substantially parallel pole plates, an open, rectangular insulating frame interposed between opposed, peripherally extending marginal areas of said plates serving to maintain such plates in spaced relation, clamping means engaged over said frame and urging said marginal areas of the plates tightly against the frame, a plate-forming member secured to the inner side of each pole plate, each such member being in the form of a perforate sheet provided with a series of spaced, parallel folds with the intervening portions of the sheet being engaged against and secured to the inner face of its respective pole plate, said folds forming substantially follow fingers extending right angularly from their respective pole plate toward but terminating short of the opposed pole plate, each finger being undulated to provide a plurality of spaces therein, the fingers of one member being interdigitated with the fingers of the other member and each hollow finger containing an electrochemically active paste, and insulating means maintaining the adjacent fingers in spaced relation to each other.

3. A compact and easily assembled battery including a plurality of substantially flat pole plates disposed in stacked parallel relation to each other, a plate forming member fixed to each of the opposed surfaces of said plates and each such member presenting hollow fingers holding electrochemically active paste and extending right angularly from its associated surface, frame means maintaining said plates in spaced relation and defining spaces for containing liquid electrolyte, said members being supported by the plates with the fingers of opposed surfaces interdigitated, insulating means between the interdigitated fingers, and said frame means being separable to permit successive stacking of said members.

4. A pancake type battery comprising a pair of substantially flat metal plates, an open rectangular insulating frame interposed between said plates and overlapped by peripherally extending marginal areas thereof, clamp means insulatedly engaging said marginal areas of the plates and serving to hold the plates and insulating frame together while exposing the outer surfaces of said plates as the electrical contacts of the battery, a plate-forming member fixed to the inner surface of each of said flat plates, each such member being in the form of a sheet of perforate metal having parallel folds and undulations forming a series of spaced parallel fingers extending toward the other plate and each of which presents a pocket for receiving an electrochemically active paste, the fingers of the two members being interdigitated, and insulating means separating the interdigitated fingers.

5. A battery as defined in claim 4 wherein said frame is formed of a hardened plastic material and outer surfaces of the overlapping marginal areas of said plates are coated with an adhesive plastic layer.

6. A battery as defined in claim 5 wherein the inner surfaces of said overlapping marginal areas of the plates are separated from said frame by flexible soft plastic material and the said clamp means is applied with pressure whereby to obtain an impervious seal between the plates and the frame.

References Cited in the file of this patent

UNITED STATES PATENTS

| | | |
|---|---|---|
| 420,234 | Johnson | Jan. 28, 1890 |
| 1,150,023 | Ford | Aug. 7, 1915 |
| 1,506,304 | Jones et al. | Aug. 26, 1924 |
| 2,167,809 | Lubeck | Aug. 1, 1939 |
| 2,496,709 | Gelardin | Feb. 7, 1950 |
| 2,677,006 | Ameln | Apr. 27, 1954 |

FOREIGN PATENTS

| | | |
|---|---|---|
| 601,227 | France | Nov. 26, 1925 |
| 30,393 | France | Feb. 2, 1926 |
| | (Addition to No. 601,227) | |
| 877,572 | France | Sept. 7, 1942 |